(12) United States Patent
Mori (10) Patent No.: US 7,073,776 B2
(45) Date of Patent: Jul. 11, 2006

(54) SLUICING VALVE DEVICE (75) Inventor: Mitsuhiro Mori, Osaka (JP)

(73) Assignee: Waterworks Technology Development Organization Co., Ltd., Osaka (JP)

(*) Notice: Subject to any disclaimer, the term of this patent is extended or adjusted under 35 U.S.C. 154(b) by 0 days.

(21) Appl. No.: 10/979,380

(22) Filed: Nov. 2, 2004

(65) Prior Publication Data

US 2006/0000999 A1 Jan. 5, 2006

(30) Foreign Application Priority Data

Jul. 1, 2004 (JP) .............................. 2004-195605

(51) Int. Cl.
 *F16K 1/00* (2006.01)
 *F16K 15/00* (2006.01)
(52) U.S. Cl. ...................... 251/334; 251/193
(58) Field of Classification Search ................ 251/193, 251/326, 329, 334
 See application file for complete search history.

(56) References Cited

U.S. PATENT DOCUMENTS

| | | |
|---|---|---|
| 3,662,778 A | 5/1972 | Leopold, Jr. |
| 3,746,304 A * | 7/1973 | Mattias ........................ 251/327 |
| 4,483,514 A | 11/1984 | Kennedy |
| 4,541,613 A * | 9/1985 | Barbe .......................... 251/326 |
| 6,283,446 B1 * | 9/2001 | Sato et al. ................... 251/193 |

FOREIGN PATENT DOCUMENTS

| | | |
|---|---|---|
| EP | 1 367 303 A2 | 12/2003 |
| GB | 779451 A | 7/1957 |
| GB | 1 385 238 A | 2/1975 |
| JP | 2003-343748 | 12/2003 |
| JP | 2003-343748 A | 12/2003 |

* cited by examiner

*Primary Examiner*—Edward K. Look
*Assistant Examiner*—John K. Fristoe, Jr.
(74) *Attorney, Agent, or Firm*—Knobbe Martens Olson & Bear, LLP (57) ABSTRACT

A sluicing valve device in which a valve element is arranged in case members attachable to a pipe, and the valve element comprises a valve element core metal fitting, an elastic seal member covering the same, and a lifting and lowering shaft formed into a rod shape along an insertion direction in order to move the valve element core metal fitting along the insertion direction inside of the pipe, wherein the valve element core metal fitting supports the elastic seal member inserted into the pipe and presses the same from the insertion direction to deform elastically, and a guide portion preventing the elastic seal member from protruding in an axial center direction of the pipe is formed on a tip end side in the insertion direction.

14 Claims, 6 Drawing Sheets

SLUICING VALVE DEVICE

BACKGROUND OF THE INVENTION

1. Field of the Invention

This invention relates to a sluicing valve device, and more particularly to a sluicing valve device having case members attachable to a pipe, and a valve element which is arranged in the case members and can be inserted into a hole formed in the pipe.

2. Description of the Related Art

In the case where piping work of water supply or the like is carried out, there has been employed a method in which water flow in the pipe is temporarily stopped using a sluicing valve device which is a water supply suspension device for non-water-cutting off pipe line while maintaining a non-water-cutting off state without cutting off the water flow on the upstream side, the work is carried forward on the downstream side, and after completing the work, the state of stopping the water is released.

Conventionally, in a valve element used as the water supply suspension device for non-water-cutting off pipe line, a rubber lining tends to be large in volume. This is because the water supply suspension device for pipe line is designed to stop water by inserting the valve element into a pipe line laid underground in which water is flowing, so that positioning of a bore hole opening and the valve element on site is required. Accordingly, in order to securely shut down the water flow, the rubber lining cannot help being large in volume. In other words, stopping the water in the pipe depends on elasticity of the rubber lining.

Furthermore, with regard to the pipe in which the water supply suspension device for non-water-cutting off pipe line is set up, there is one used for long years after laying underground, relatively new one, etc. and thus even pipes with the same outside diameters commonly have different inside diameters from each other. As a result, in order to improve a water stopping performance, the rubber lining cannot help being large in volume.

On site, in order to securely stop the water in the pipe, it is necessary to satisfy the following conditions and to adjust balance.

(1) Compressive force of the rubber lining between a bottom portion of the valve element and a bottom portion of the pipe inner surface is made to act.

(2) Compressive force of the rubber lining between a side surface of the valve element and a side surface portion of the pipe inner surface is made to act.

(3) The bore hole opening is blocked by an upper portion of the valve element.

With regard to (1) and (2), although an increase of the rubber lining in volume allows conditions to some extent to be addressed, a deformation amount of the valve element becomes large when shutting the valve element, and torque required for shutting the valve element from contact of the valve element with the bottom of the pipe until water is completely stopped tends to be large. When the deformation amount is large, sufficient compressibility with the pipe inner surface can hardly be obtained, and thus a sufficient water stopping performance cannot be achieved. There, therefore, has been a problem that repetition of opening and closing operations causes the rubber lining to be damaged by the bore hole opening. With regard to (3), after securely blocking the inside of the pipe according to (1) and (2), the bore hole opening is required to be blocked. If the bore hole opening is precedently blocked, a flange portion of the rubber lining comes into contact with the bore hole opening and shutting torque is increased, thereby preventing the compression of the valve element rubber lining from being transmitted to the pipe inner surface. As a result, further fastening causes a problem that the rubber lining is damaged by the bore hole opening.

In this manner, it is necessary to adjust the balance of the above-mentioned (1) to (3) with respect to existing piping with various inside diameters, and thus there is a demand for a water supply suspension device for non-water-cutting off pipe line having a higher water stopping performance.

Accordingly, the applicant of the present invention has developed a sluicing valve device described in Japanese Patent Application Laid-Open No. 2003-343748. This sluicing valve device has a spindle and a valve rod which are inserted into a pipe as a driving shaft, and a movable piece bringing a seal member into pressure contact with a wall surface inside of a pipe, which enables water to sufficiently stop. In addition, the vertical size can be smaller than that of conventional one.

However, there is a problem that this sluicing valve device has a number of components and a complex structure, thereby leading to a high manufacturing cost.

SUMMARY OF THE INVENTION

Accordingly, the object of the present invention is to provide a sluicing valve device which exerts a high water stopping performance with respect to existing piping with various inside diameters, but whose manufacturing cost is still inexpensive.

A sluicing valve device according to the present invention comprises: case members attachable to a pipe; and a valve element which is arranged inside of the case members and can be inserted into a hole formed in the pipe, the sluicing valve device characterized in that:

the valve element comprises a valve element core metal fitting, an elastic seal member covering the valve element core metal fitting, and a lifting and lowering shaft formed into a rod shape along the insertion direction in order to move the valve element core metal fitting along this insertion direction inside of the pipe, wherein the valve element core metal fitting supports the elastic seal member inserted into the pipe and presses the elastic seal member from the insertion direction to deform elastically; and a guide portion preventing the elastic seal member from protruding in an axial center direction of the pipe is formed on a tip end side in the insertion direction.

With this structure, since the elastic seal member covering the valve element inserted into the pipe does not protrude in the axial center direction but is brought into pressure contact with only an inner peripheral surface of the pipe. Accordingly, the elastic seal member can adhere to the inner peripheral surface of the pipe with pressure in a small deformation amount, so that torque required for the deformation is small but the water stopping performance is still high, and thus with respect to existing pipes having various inside diameters, water can be securely stopped. In addition, the elastic seal member does not need to be large in volume in order to enhance the water stopping performance, nor does the device structure need to be complex, nor does the number of components need to be increased.

As a result, there can be provided a sluicing valve device which exerts a high water stopping performance with respect to existing piping with various inside diameters, but whose manufacturing cost is still inexpensive.

It is preferable that the elastic seal member has a projected portion formed at a tip end thereof in the insertion direction, and that the projected portion is brought into pressure contact with a wall surface inside of the pipe with movement of the valve element in the insertion direction.

With this structure, a compression amount of the elastic seal member is locally large during pressing and thus water can be securely stopped at small torque. Consequently, torque at the time of shutting off can be reduced. Accordingly, there can be provided a sluicing valve device which exerts the high water stopping performance in a smaller deformation amount with respect to existing pipes having various inside diameters.

A width of the projected portion is preferably 20 to 60% of that of a thick portion.

In this range, the pipes with different inside diameters can be addressed more flexibly and the water can be securely stopped, and thus with respect to pipes set on different dates and having different inside states, a high water stopping performance can be exerted. A width of the projected portion is more preferably 30 to 50% of that of the thick portion.

It is preferable that the valve element core metal fitting has a flange portion protruded circumferentially along an outer peripheral shape of the pipe, and a tapered side surface extended downward from the flange portion, and has the guide portion at the tip end of this side surface in the insertion direction.

When the valve element core metal fitting is inserted into the pipe, this structure prevents upward deformation of the elastic seal member lest the elastic seal member should be deformed and protruded toward the upper side by bringing the elastic seal member into contact with the pipe and pressing it, and allows the elastic seal member to be smoothly and effectively protruded toward the inner peripheral surface of the pipe.

It is preferable that the flange portion of the valve element core metal fitting protrudes circumferentially along the outer peripheral shape of the pipe and that the elastic seal member has a flange portion protruded circumferentially downward from the above-mentioned flange portion.

With this structure, when the valve element is inserted through a hole formed in the pipe, the hole in a pipe surface is blocked and thus liquid in the pipe can be securely prevented from leaking through this hole.

An inclined portion is preferably provided in an edge on the inner peripheral side of the guide portion on the tip end side in the insertion direction, which is formed in the valve element core metal fitting.

With this structure, the elastic seal member can be smoothly attached to the guide portion.

BRIEF DESCRIPTION OF THE DRAWINGS

FIG. 1 show a sluicing valve device according to one embodiment of the present invention.

FIG. 2 show half cross-sectional views of a sluicing valve element.

FIG. 4 show a process in which the sluicing valve device according to the present invention is attached to the existing pipe to stop water.

FIG. 5 show the process in which the sluicing valve device according to the present invention is attached to the existing pipe to stop water.

FIG. 6 show the process in which the sluicing valve device according to the present invention is attached to the existing pipe to stop water.

DETAILED DESCRIPTION OF THE PREFERRED EMBODIMENTS

Figure 1A:
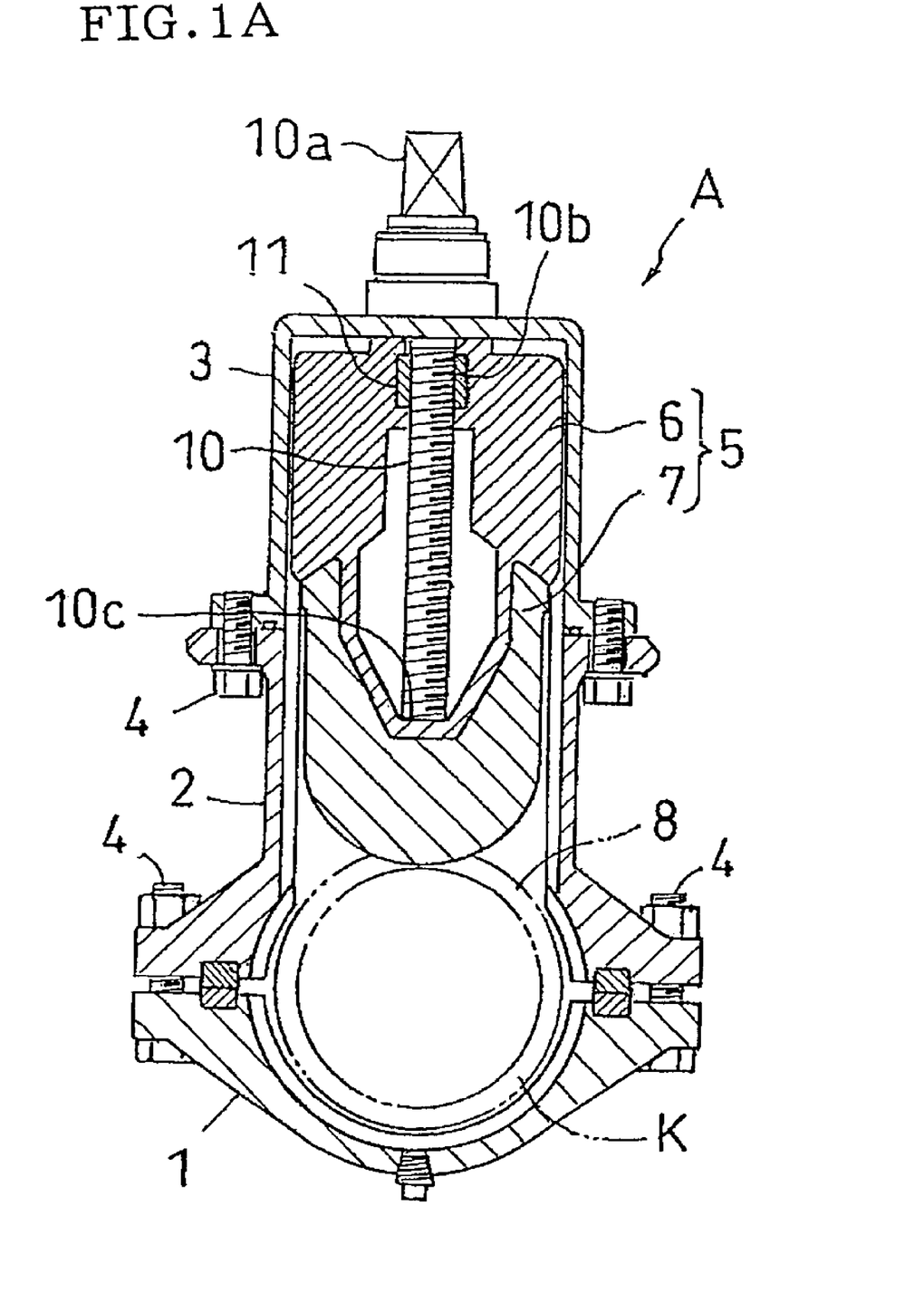
FIG. 1A shows a half longitudinal cross-sectional view.
Figure 1B:
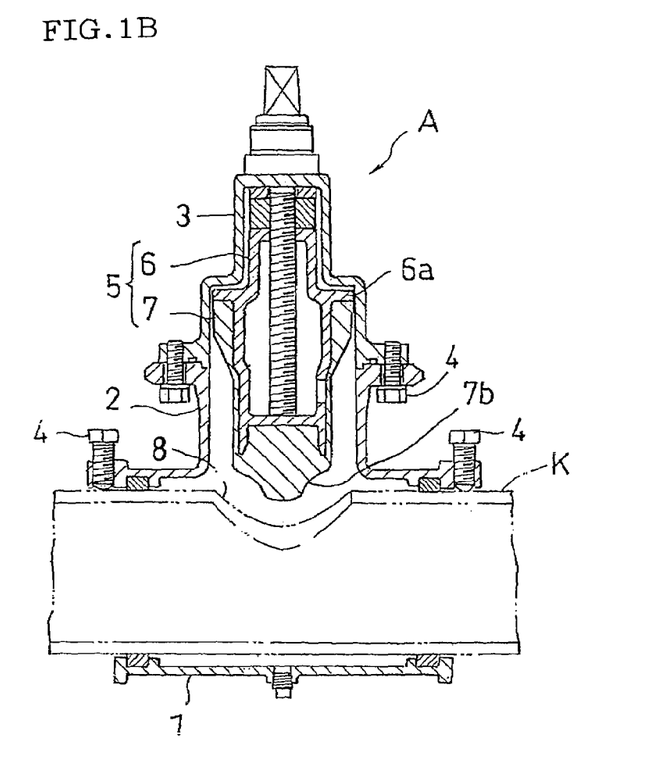
FIG. 1B shows a half traverse cross-sectional view.

One embodiment of a sluicing valve device according to the present invention is described in detail, referring to the drawings. FIG. 1 show a state before the sluicing valve element is inserted, that is, the sluicing valve device according to the present embodiment is attached to an existing pipe, FIG. 1A shows a longitudinal cross-sectional structure as viewed from a pipe axial direction, and FIG. 1B shows a traverse cross-sectional structure in parallel with the pipe axial direction. In FIG. 1, the existing pipe is indicated by virtual line.

This sluicing valve device A is attached to an existing water pipe K and is made up of a lower case member 1, an intermediate case member 2, and an upper case member 3. These respective case members 1, 2, and 3 are fixed to each other by a fixing mechanism 4 made up of a bolt and a screw nut. Packing is inserted between the respective case members 1, 2 and 3 so as to form a watertight structure.

Figure 2A:
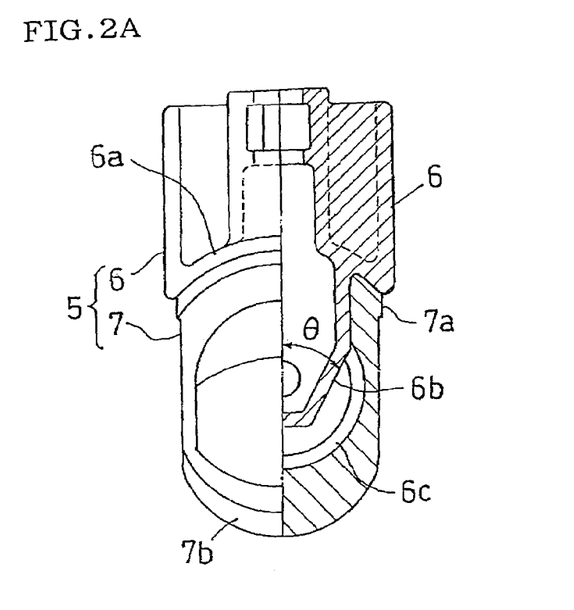
FIG. 2A shows a half longitudinal cross-sectional view.
Figure 2B:
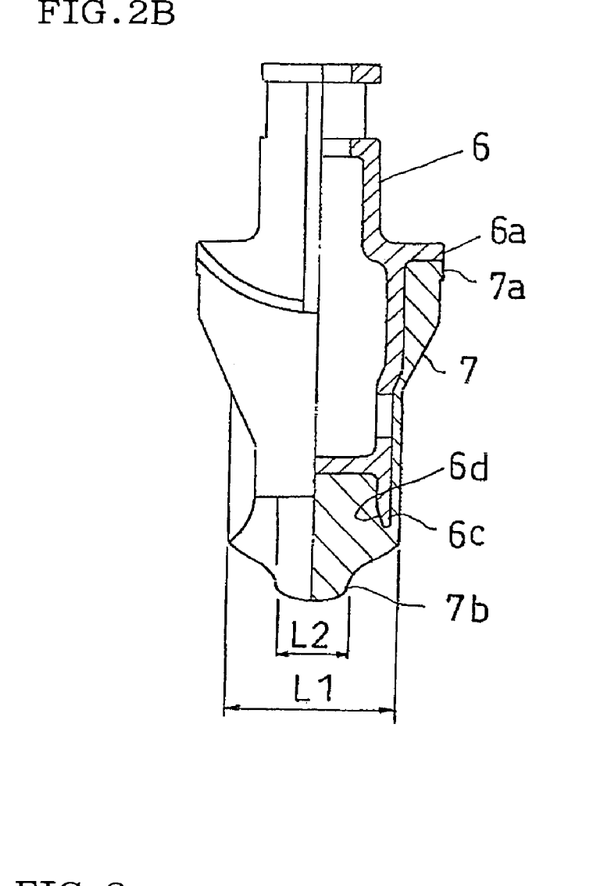
FIG. 2B shows a half transverse cross-section view.

Inside of the respective case members 1, 2 and 3, a sluicing valve element (hereinafter, referred to as a valve element) 5 shown in FIGS. 2A and 2B is arranged. In this valve element 5, an inner surface of a lower end thereof is in contact with a lower end 10*c* of a valve rod 10 which is a lifting and lowering shaft, and the valve element 5 is moved downward by rotating and lowering motion of the valve rod 10, that is, is inserted into the pipe K. An upper end 10*a* of the valve rod 10 is manually or automatically rotatable through a rotary jig (not shown). When the valve rod 10 is rotated, by screwing action between a screw piece 11 attached at substantial central upper portion of the valve element 5 and a male screw 10*b* formed in the valve rod 10, the valve element 5 can be moved vertically.

Furthermore, FIG. 2A shows a half longitudinal cross-sectional structure of the valve element, and FIG. 2B shows a half traverse cross-sectional structure of the valve element. Hereinafter, this valve element 5 is described.

This valve element 5 is configured by a valve element core metal fitting 6 and a rubber lining 7 which is an elastic seal member and covers a portion where the valve element core metal fitting 6 comes into contact with water inside of the pipe. In other words, it is structured such that the rubber lining 7 covers the valve element core metal fitting 6 downward from a flange portion 6*a* of the valve element core metal fitting 6, which protrudes circumferentially along an outer peripheral shape of the pipe. This rubber lining 7 also has a flange portion 7*a* protruded circumferentially, and this portion enables a bore hole opening 8 which is a through-hole to be blocked when the valve element 5 is inserted into the pipe. The flange portion 6*a* of the valve element core metal fitting 6 has a function of preventing upward deformation of the flange portion 7*a* lest the flange portion 7a of the rubber lining should be deformed and protruded toward the upper side when brought into contact with the pipe K and pressed.

In a tip end portion of the rubber lining 7, a projected portion 7b having an outer shape of an arc partially along a bottom inner periphery inside of the pipe is formed. Specifically, this projected portion 7b functions so as to be continuously pressed and deformed to increase water stopping force after the rubber lining 7 moves through the pipe to come into contact with the bottom portion inside of pipe. In this manner, since the projected portion 7b is provided, a compression amount of the rubber lining 7 becomes locally large when pressed, so that secure stopping of water can be attained at small torque, and consequently, torque during shutting off can be reduced.

As shown in FIG. 2B, since the rubber lining 7 is formed with a thick portion L1 and a thin portion L2 at the tip end constituting the projected portion 7b, it flexibly addresses the pipes each having the same outside diameter and a different inside diameter to securely stop water. Accordingly, with respect to pipes set on different dates and having different inside states, a high water stopping performance can be exerted. In this case, a width of the thin portion L2 constituting the projected portion 7b is preferably 20 to 60% of the thick portion L1, more preferably 30 to 50%.

The valve element core metal fitting 6, in a lower portion thereof from the flange portion 6a, has a tapered portion in a side surface 6b, and a guide edge portion 6c which is a guide portion and has a tip end thereof thinned, as shown in FIG. 2A. An inclination angle θ of the tapered side surface 6b is preferably 20 to 30°. In this range, when the rubber lining 7 is inserted into the pipe and the tip end portion 7b of the rubber lining 7 is brought into contact with the bottom portion inside of the pipe and pressed, in order to simultaneously disperse the compressive force in a horizontal direction, even a smaller force can perform the dispersion, and thus the torque when the valve rod is moved through the pipe is small and a high water stopping performance can be obtained. In the guide edge portion 6c having the tip end thinned, a chamfer portion 6d is formed on the inner side and the presence of this guide edge portion 6c can securely prevent the rubber lining 7 from protruding in a parallel direction with the pipe axis inside of the pipe when the rubber lining 7 is compressed and deformed, and thus the rubber lining 7 can be effectively brought into close contact with the pipe inner surface.

Figure 3:
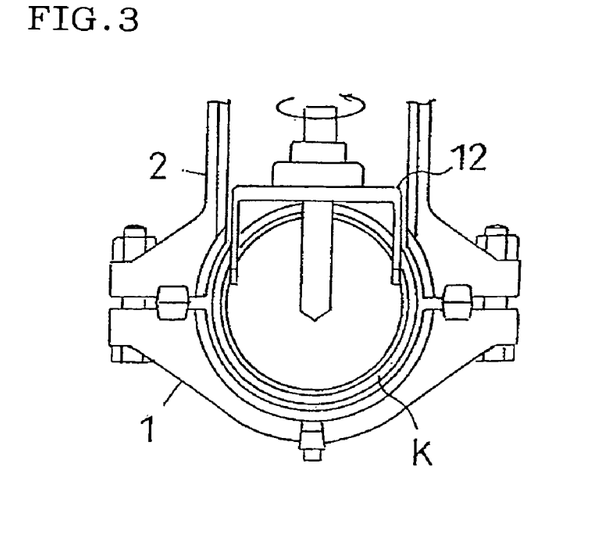
FIG. 3 shows a longitudinal cross-sectional view illustrating a process in which the sluicing valve device according to the present invention is attached to an existing pipe to stop water.
Figure 4A:
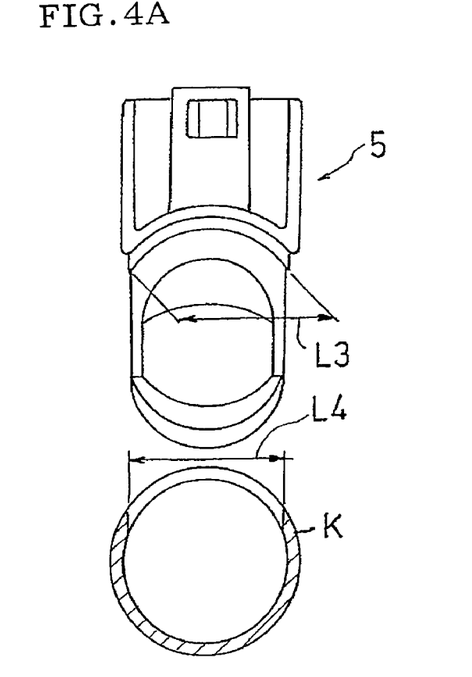
FIG. 4A shows a longitudinal cross-sectional view.
Figure 4B:
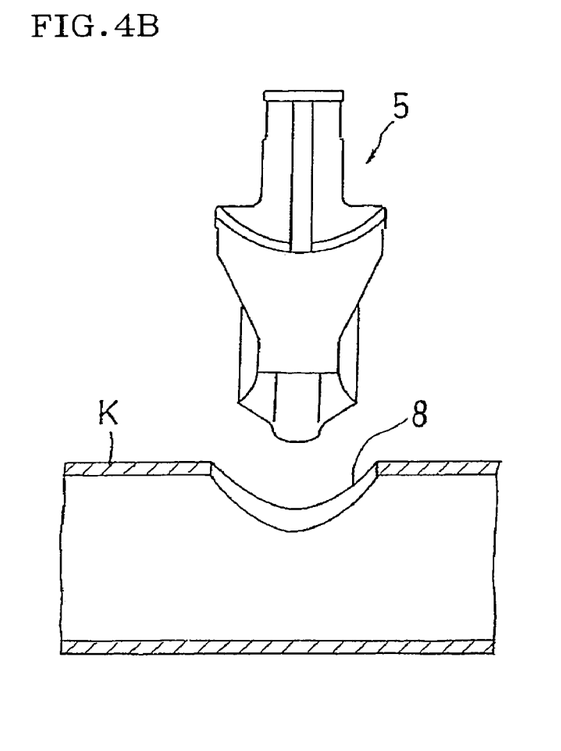
FIG. 4B shows a transverse cross-sectional view.
Figure 5A:
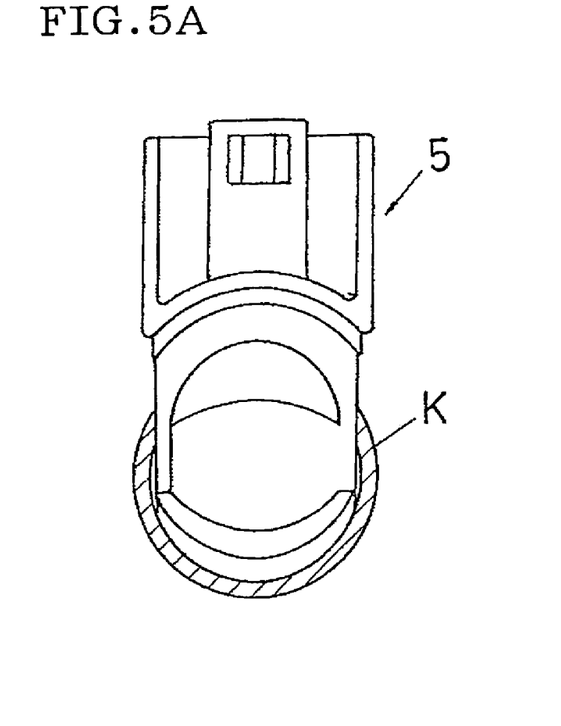
FIG. 5A shows a longitudinal cross-sectional view.
Figure 5B:
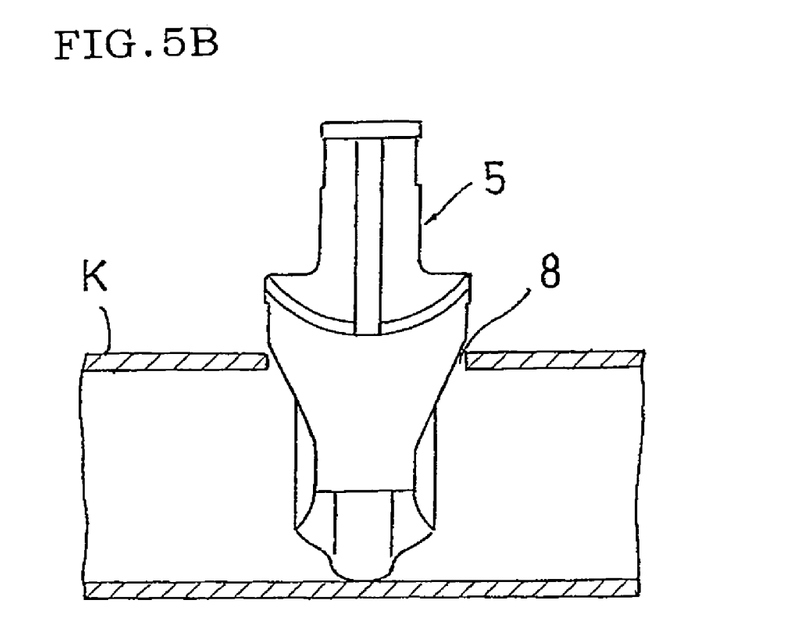
FIG. 5B shows a transverse cross-sectional view.

Next, referring to FIGS. 3 to 5, a process in which the sluicing valve device A is attached to the existing water pipe K to stop water is described.

Firstly, after the sluicing valve device A is attached to the pipe K, a hole saw 12 having an outside diameter of 92 to 100% with respect to the inside diameter of the pipe K is used to bore the pipe K while rotating the hole saw 12. In this case, when the outside diameter of the hole saw 12 is larger than the inside diameter of the pipe K, a step is generated in the inner surface of the pipe when the cutting is finally finished, which may deteriorate the water stopping performance. When the outside diameter of the hole saw 12 is less than 92% of the inside diameter of the pipe K, there arises a necessity that the rubber lining is largely deformed in stopping water by the valve element 5, thereby leading to instability of the water stopping performance.

Figure 6A:
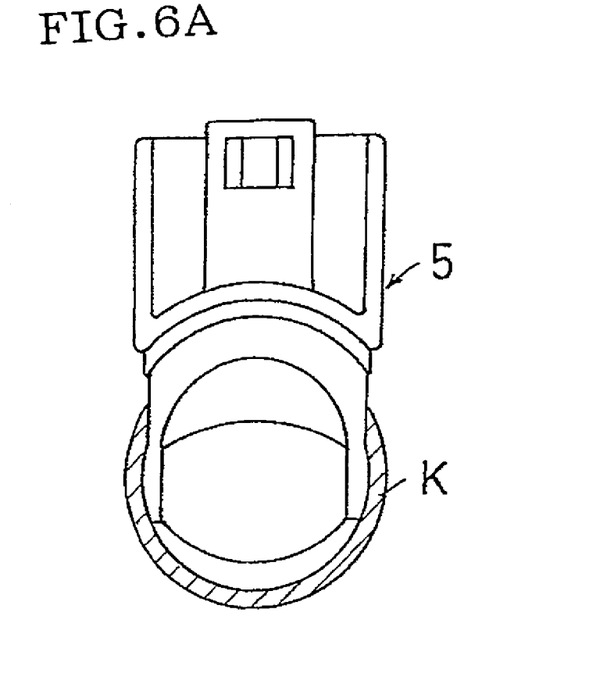
FIG. 6A shows a longitudinal cross-sectional view.
Figure 6B:
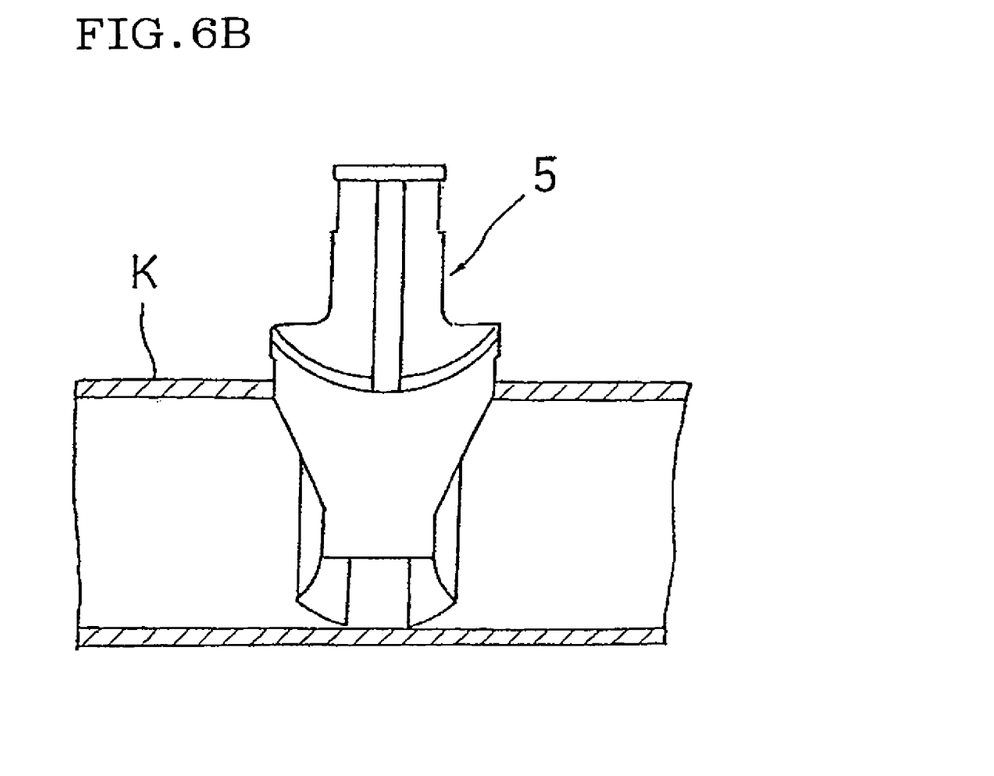
FIG. 6B shows a transverse cross-sectional view.

When the boring by the hole saw 12 is completed, the hole saw 12 is pulled up, and the valve element 5 is lowered into the pipe while rotating the valve rod 10 by rotating the upper end 10a of the valve rod. FIG. 4 show a state immediately before the valve element 5 is lowered into the pipe, FIG. 4A is a longitudinal cross-sectional view, FIG. 4B is a traverse cross-sectional view. FIGS. 4 to 6 show only the valve element 5 and the pipe K for simplification.

In FIG. 4, a width L3 at the lower portion of the valve element 5 (the portion to which the rubber lining is applied) is almost the same as a bore hole diameter L4 of the pipe K.

When the valve element 5 reaches the bottom surface inside of the pipe K, a state as shown in FIG. 5 is obtained. At this stage, the rubber lining located at the side surface of the valve element is not in contact with the pipe wall, and thus it is not in the state capable of stopping water. Accordingly, the water flowing through the pipe flows through a gap between the bore hole opening 8 and the side surface of the valve element to the downstream side.

When the valve rod 10 is further rotated and fastened, the valve element 5 is lowered, and as shown in FIG. 6, the projected portion 7b at the tip end of the rubber lining is pressed to the bottom portion of the pipe to be brought into pressure contact and to be compressed and deformed. At the same time, it comes into contact with the side surface inside of the pipe to attain the close contact and block the inside of the pipe. At this point, the inside of the pipe is securely blocked and the water is stopped. Accordingly, various engineering works can be performed on the downstream side at ease.

The invention claimed is:

1. A sluicing valve device comprising:
   case members configured to be attachable to a pipe; and
   a valve element which is arranged inside of the case members and is adapted to be inserted into a hole formed in the pipe, wherein the valve element comprises:
   a valve element core metal fitting,
   an elastic seal member covering and being supported by the valve element core metal fitting, and
   a lifting and lowering shaft having a rod shape for moving the valve element core metal fitting along an insertion direction to said hole, to press and deform elastically the elastic seal member in the insertion direction,
   said valve element core metal fitting comprising at its tip end in the insertion direction: (i) a tapered side surface extended downward, and (ii) a guide portion extended downward further than the tapered side surface, said guide portion having a width greater than a maximum outer width of the tapered side surface in a direction perpendicular to the axial center direction of the pipe for preventing the elastic seal member from protruding in an axial center direction of the pipe.

2. The sluicing valve device according to claim 1, wherein the elastic seal member has a projected portion formed at a tip end thereof in the insertion direction, and the projected portion is brought into pressure contact with a wall surface inside of the pipe with movement of the valve element in the insertion direction.

3. The sluicing valve device according to claim 2, wherein a width of the projected portion is 20 to 60% of that of a thick portion.

4. The sluicing valve device according to claim 1, wherein the valve element core metal fitting has a flange portion protruded circumferentially along an outer peripheral shape of the pipe when attached to the pipe, and the tapered side surface is extended downward from the flange portion.

5. The sluicing valve device according to claim 4, wherein the elastic seal member has a flange portion protruded circumferentially downward from the flange portion of the valve element core metal fitting.

6. The sluicing valve device according to claim 1, wherein an inclined portion is provided in an edge on the inner peripheral side of the guide portion on the tip end side in the insertion direction, which inclined portion is inclined outwardly and thinned toward the tip end of the guide portion.

7. The sluicing valve device according to claim 1, wherein the tapered side surface has an inclination angel of 20–30° with respect to the insertion direction.

8. A sluicing valve device comprising:
a pipe holding member configured to be attachable to a pipe; and
a valve element provided inside the pipe holding member, said valve element being configured to be inserted into a hole formed in the pipe to stop flowing water,
wherein said valve element comprises a metal core, an elastic seal member covering the metal core, and a shaft having a rod shape provided inside the metal core for lifting and lowering the metal core and elastic seal member along a direction perpendicular to the pipe,
wherein said elastic seal member is deformed elastically when pressed by the metal core and the shaft downward in the hole, and said metal core comprises at its tip end in the insertion direction: (i) a tapered side surface extended downward, and (ii) a guide portion extended downward further than the tapered side surface, said guide portion having a width greater than a maximum outer width of the tapered side surface in a direction perpendicular to the axial center direction of the pipe for preventing the elastic seal member from protruding to an axial center direction of the pipe.

9. The sluicing valve device according to claim 8, wherein the elastic seal member has a projected portion formed at a tip end thereof, and said projected portion is to be contact with an inner wall of the pipe in accordance with a downward movement of the valve element.

10. The sluicing valve device according to claim 9, wherein the width of said projected portion is 20 to 60% of that of a thick portion of the elastic seal member.

11. The sluicing valve device according to claim 8, wherein the metal core has a flange portion protruded circumferentially along an outer peripheral shape of the pipe when attached to the pipe, and the tapered side surface is extended downward from the flange portion.

12. The sluicing valve device according to claim 11, wherein the elastic seal member has a flange portion protruded circumferentially downward from the flange portion of the metal core.

13. The sluicing valve device according to claim 8, wherein the metal core has an inclined portion provided at an edge on the inner peripheral side of the guide portion, said inclined portion being inclined outwardly and thinned toward the edge of the guide portion.

14. The sluicing valve device according to claim 8, wherein the tapered side surface has an inclination angel of 20–30° with respect to the insertion direction.

* * * * *